US011942674B2

(12) United States Patent
Wang et al.

(10) Patent No.: US 11,942,674 B2
(45) Date of Patent: Mar. 26, 2024

(54) ANTENNA STRUCTURE AND TERMINAL DEVICE

(71) Applicant: VIVO MOBILE COMMUNICATION CO., LTD., Guangdong (CN)

(72) Inventors: Yijin Wang, Dongguan (CN); Xianjing Jian, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 354 days.

(21) Appl. No.: 17/358,362

(22) Filed: Jun. 25, 2021

(65) Prior Publication Data

US 2021/0320395 A1 Oct. 14, 2021

Related U.S. Application Data

(63) Continuation-in-part of application No. PCT/CN2019/124524, filed on Dec. 11, 2019.

(30) Foreign Application Priority Data

Dec. 28, 2018 (CN) ......................... 201811621911.0

(51) Int. Cl.
*H01Q 1/22* (2006.01)
*H01Q 1/36* (2006.01)
(Continued)

(52) U.S. Cl.
CPC ............. *H01Q 1/2283* (2013.01); *H01Q 1/36* (2013.01); *H01Q 1/48* (2013.01); *H01Q 1/50* (2013.01)

(58) Field of Classification Search
CPC ............. H01Q 1/2283; H01Q 1/48–52; H01Q 1/241–243
See application file for complete search history.

(56) References Cited

U.S. PATENT DOCUMENTS

| | | | |
|---|---|---|---|
| 9,692,142 | B2 | 6/2017 | Ek et al. |
| 2009/0231213 | A1 | 9/2009 | Ishimiya |

(Continued)

FOREIGN PATENT DOCUMENTS

| | | |
|---|---|---|
| CN | 101297440 A | 10/2008 |
| CN | 103606756 A | 2/2014 |

(Continued)

OTHER PUBLICATIONS

International Search Report and Written Opinion of the International Searching Authority regarding International Patent Application No. PCT/CN2019/124524, dated Mar. 10, 2020. Translation provided by Bohui Intellectual Property.

(Continued)

*Primary Examiner* — Hasan Islam
(74) *Attorney, Agent, or Firm* — Harness, Dickey & Pierce, P.L.C.

(57) ABSTRACT

An antenna structure includes a resonant arm, a first feed line portion, a first floor, a substrate, a second floor, a second feed line portion, and at least two radiation pieces. The resonant arm is electrically connected to the first floor through the first feed line portion. The substrate is attached to the second floor. The second floor is disposed on a surface of the substrate proximate to the first floor. Two ends of a shield layer of the second feed line portion are connected to the first floor and the second floor, respectively. The at least two radiation pieces are disposed on a surface of the substrate away from the second floor. The second feed line portion wraps a feed line inside. The feed line passes through the substrate and the second floor and electrically connects to the at least two radiation pieces.

12 Claims, 4 Drawing Sheets

(51) Int. Cl.
*H01Q 1/48* (2006.01)
*H01Q 1/50* (2006.01)

(56) References Cited

U.S. PATENT DOCUMENTS

| | | | | |
|---|---|---|---|---|
| 2014/0306846 | A1* | 10/2014 | Nakatsu | H01Q 21/29 343/700 MS |
| 2014/0368405 | A1 | 12/2014 | Ek et al. | |
| 2017/0012344 | A1 | 1/2017 | Wu et al. | |
| 2018/0191060 | A1 | 7/2018 | Wu et al. | |
| 2018/0233817 | A1 | 8/2018 | Izawa | |
| 2020/0161749 | A1* | 5/2020 | Onaka | H01Q 21/24 |

FOREIGN PATENT DOCUMENTS

| | | | |
|---|---|---|---|
| CN | 204905439 | U | 12/2015 |
| CN | 106602243 | A | 4/2017 |
| CN | 206225540 | U | 6/2017 |
| CN | 107658561 | A | 2/2018 |
| CN | 109728414 | A | 5/2019 |
| EP | 1950833 | A1 | 7/2008 |

OTHER PUBLICATIONS

First Office Action regarding Chinese Patent Application No. 201811621911.0, dated Jan. 3, 2020. Translation provided by Bohui Intellectual Property.

Supplementary European Search Report regarding Patent Application No. 19904004.9-1205/3905434; PCT/CN2019/124524, dated Jan. 14, 2022.

First Office Action regarding Indian Patent Application No. 202147031542, dated Mar. 8, 2022. Translation provided by the Intellectual Property Office of India.

* cited by examiner

ANTENNA STRUCTURE AND TERMINAL DEVICE

CROSS-REFERENCE TO RELATED APPLICATIONS

This application is a Bypass Continuation-in-Part Application of PCT/CN2019/124524 filed on Dec. 11, 2019, which claims priority to Chinese Patent Application No. 201811621911.0 filed on Dec. 28, 2018, which are incorporated herein by reference in their entirety.

TECHNICAL FIELD

This disclosure relates to the field of communications technologies, and in particular, to an antenna structure and a terminal device.

BACKGROUND

With rapid development of communication technologies, multi-antenna communication has become a mainstream and future development trend for terminal devices. In this process, millimeter-wave antennas are gradually introduced to terminal devices. In the related art, a millimeter-wave antenna is generally provided in the form of a separate antenna module which requires an accommodating space inside the terminal device. As such, the entire terminal device has a relatively large volume, resulting in weak overall competitiveness of the terminal device.

SUMMARY

According to a first aspect, some embodiments of this disclosure provides an antenna structure, including: a resonant arm, a first feed line portion, a first floor, a substrate, a second floor, a second feed line portion, and at least two radiation pieces, where the resonant arm is electrically connected to the first floor through the first feed line portion;

the substrate is attached to the second floor, the second floor is disposed on a surface of the substrate proximate to the first floor, and two ends of a shield layer of the second feed line portion are connected to the first floor and the second floor, respectively; and the at least two radiation pieces are disposed on a surface of the substrate away from the second floor, the second feed line portion wraps a feed line inside, and the feed line passes through the substrate and the second floor and electrically connects to the at least two radiation pieces.

According to a second aspect, some embodiments of this disclosure further provide a terminal device, including the foregoing antenna structure.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure shall fall within the protection scope of this disclosure.

Figure 1:
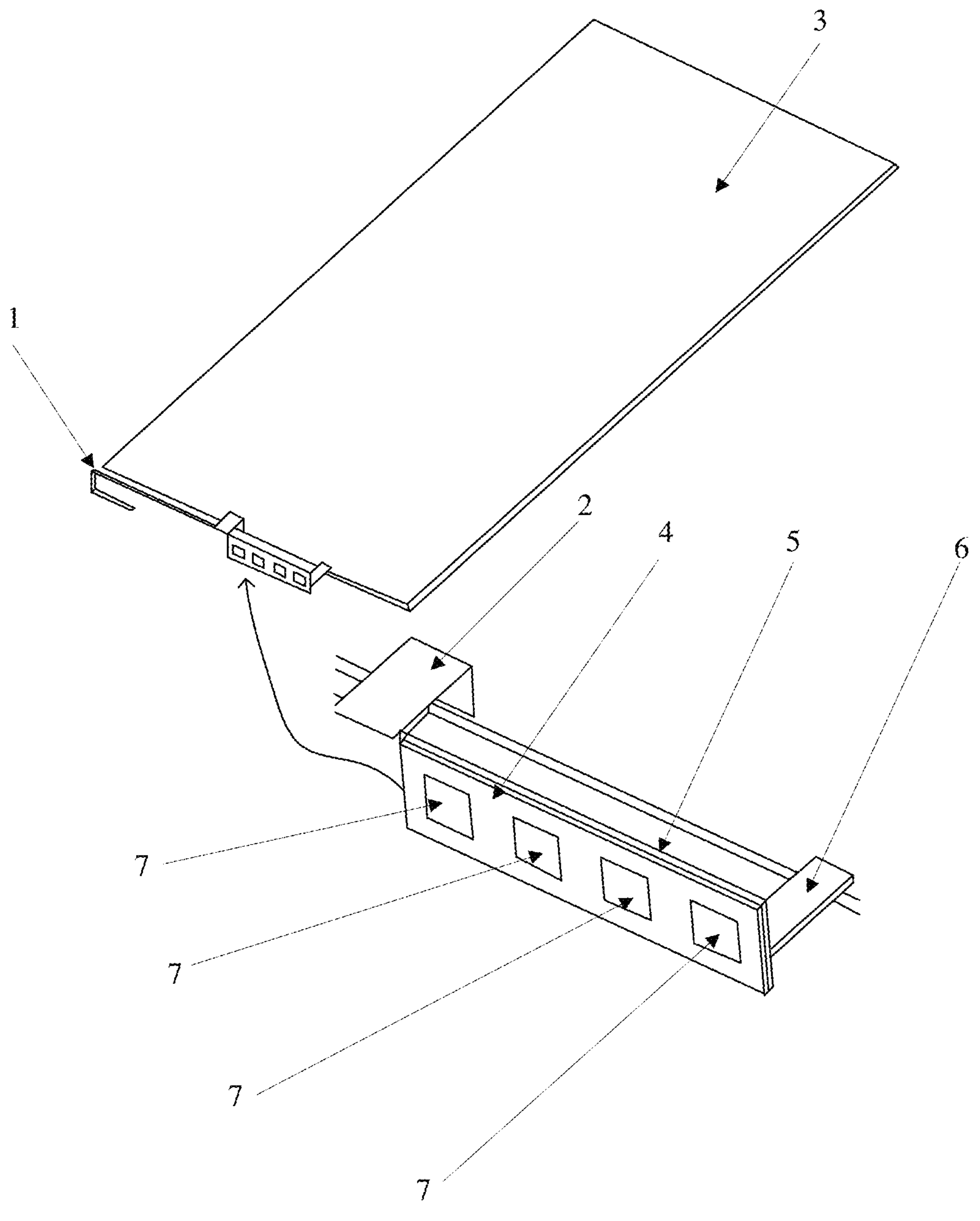
FIG. 1 is a structural diagram 1 of an antenna structure according to some embodiments of this disclosure.

FIG. 1 is a structural diagram of an antenna structure according to some embodiments of this disclosure. As shown in FIG. 1, the antenna structure includes a resonant arm 1, a first feed line portion 2, a first floor 3, a substrate 4, and a second floor 5, a second feed line portion 6, and at least two radiation pieces 7, where the resonant arm 1 is electrically connected to the first floor 3 through the first feed line portion 2; the substrate 4 is attached to the second floor 5, the second floor 5 is disposed on a surface of the substrate 4 proximate to the first floor 3, and two ends of a shield layer 61 of the second feed line portion 6 are connected to the first floor 3 and the second floor 5 respectively; and the at least two radiation pieces 7 are disposed on a surface of the substrate 4 away from the second floor 5, the second feed line portion 6 wraps a feed line 62 inside, and the feed line 62 passes through the substrate 4 and the second floor 5 and electrically connects to the at least two radiation pieces 7.

In this embodiment, the first floor 3 may be a main board of a terminal device, a liquid crystal display module, or a metal frame structure that wraps a liquid crystal display module. The antenna structure includes a sub-6 GHz antenna and a millimeter-wave array antenna. The sub-6 GHz antenna works at the band from 0.6 GHz to 6 GHz. The feed line 62 passes through the substrate 4 and the second floor 5 and electrically connects to the at least two radiation pieces 7, meaning that each of the at least two radiation pieces 7 is connected to the feed line 62, and the feed line 62 is connected to a feed source (that is, a millimeter-wave signal source), so that millimeter-wave signals are radiated from the at least two radiation pieces 7. In this way, the at least two radiation pieces 7 form a millimeter-wave array antenna in cooperation with the feed source. The foregoing second feed line portion 6 may be a coaxial cable or a flexible printed circuit board.

In this embodiment, the resonant arm 1 is electrically connected to the first floor 3 through the first feed line portion 2, which can be understood as the first feed line portion 2 feeding a sub-6 GHz signal on the floor to the resonant arm 1. The second feed line portion 6 may include at least a shielding layer 61, an insulating layer, an inner core layer, and the like. The second feed line portion 6 wraps a feed line 62 inside, which can be understood as the inner core layer in the second feed line portion 6 being a feed line 62 of a millimeter-wave signal, and the feed line 62 passes through the substrate 4 and the second floor 5 and electrically connects to the at least two radiation pieces 7.

In this embodiment, the two ends of the shield layer 61 of the second feed line portion 6 are connected to the first floor 3 and the second floor 5 respectively. To be specific, one end of the shield layer 61 of the second feed line portion 6 is connected to the first floor 3 (ground of the main board), and the other end of the shield layer 61 of the second feed line portion 6 is connected to the second floor 5 (a ground of the millimeter-wave array antenna). Therefore, the ground of the millimeter-wave array antenna becomes part of the sub-6 GHz antenna, acting as the ground of the millimeter-wave array antenna while also serving as part of a radiator of the sub-6 GHz antenna. The shield layer 61 of the second feed line portion 6 can also serve as a feed ground structure of the sub-6 GHz antenna.

In this embodiment, the inner core layer in the second feed line portion 6 is the feed line 62 of the millimeter-wave signal, and the feed line 62 passes through the substrate 4 and the second floor 5 and electrically connects to the at least two radiation pieces 7. In this way, the shielding layer 61 of the second feed line portion 6 can not only provide good shielding protection for the feed line 62, but also allow the feed source to feed a current along the shortest path, making the millimeter-wave array antenna have better performance.

In this embodiment, the substrate 4, the second floor 5, and the radiation pieces 7 may be a circuit board formed of a rigid FR4 material, or a circuit board with a flexible substrate, for example, a flexible printed circuit board (FPC), a liquid crystal polymer (LCP), or the like.

In this embodiment, a millimeter-wave array antenna is added to the sub-6 GHz antenna, and a structure of the millimeter-wave array antenna is reused as a sub-6 GHz antenna or part of a sub-6 GHz antenna, so that the space and communication quality of the sub-6 GHz antenna are not affected. Moreover, the accommodating space for the millimeter-wave antenna is reduced, which helps reduce the volume of the terminal device.

Optionally, a connecting portion 8 is disposed between the resonant arm 1 and the first feed line portion 2.

Figure 2:
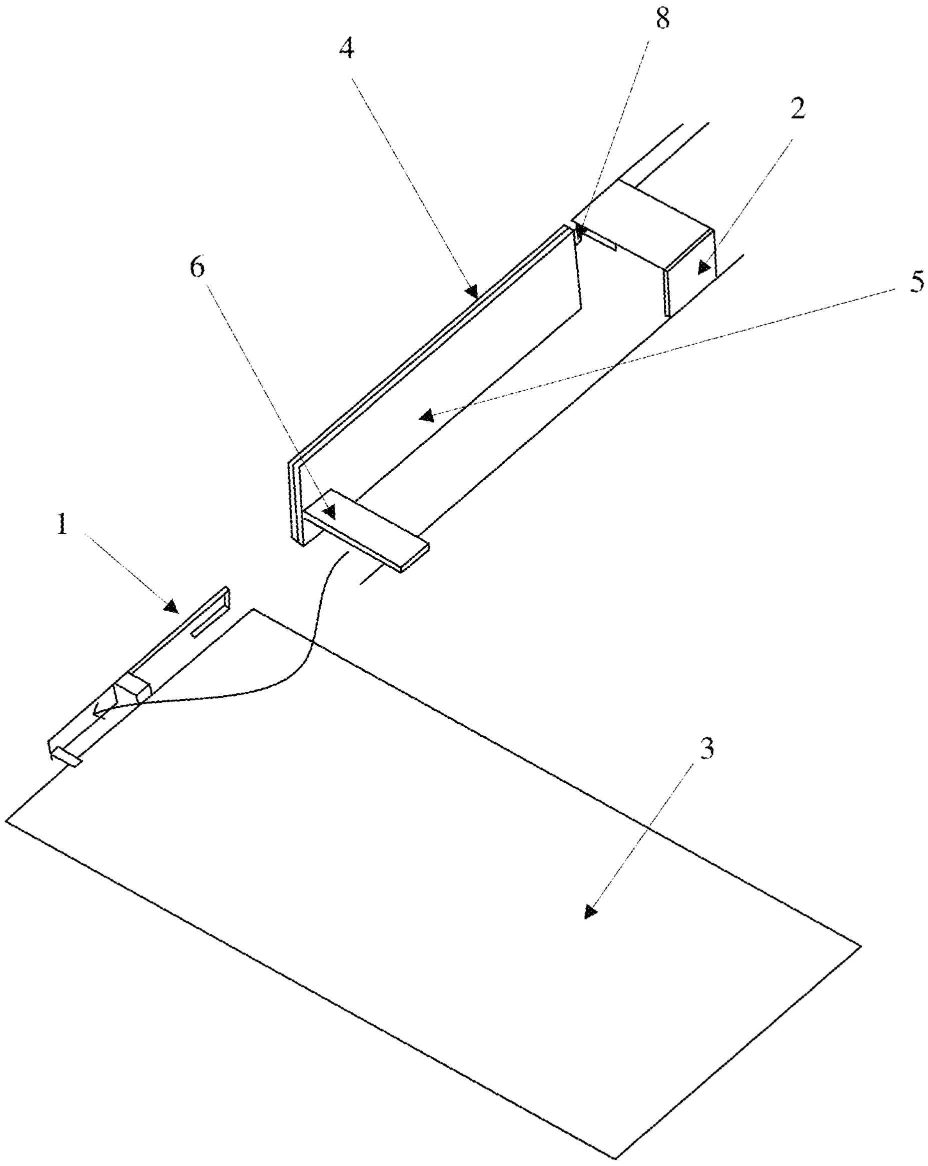
FIG. 2 is a structural diagram 2 of an antenna structure according to some embodiments of this disclosure.

For better understanding the foregoing structure, reference may be made to FIG. 2. FIG. 2 is a structural diagram of an antenna structure according to some embodiments of this disclosure. As shown in FIG. 2, a connecting portion 8 is disposed between the resonant arm 1 and the second floor 5, making a better connection between the resonant arm 1 and the second floor 5.

Optionally, the shield layer 61 of the second feed line portion 6 is connected to a first end of the second floor 5, and the first end is away from the resonant arm 1.

In this embodiment, for better understanding the foregoing structure, reference may be made to FIG. 1 and FIG. 2. As shown in FIG. 1 and FIG. 2, the shield layer 61 of the second feed line portion 6 is connected to the first end of the second floor 5, and the first end is away from the resonant arm 1.

Optionally, the shield layer 61 of the second feed line portion is connected to a second end of the second floor, and the second end is close to the resonant arm.

Figure 3:
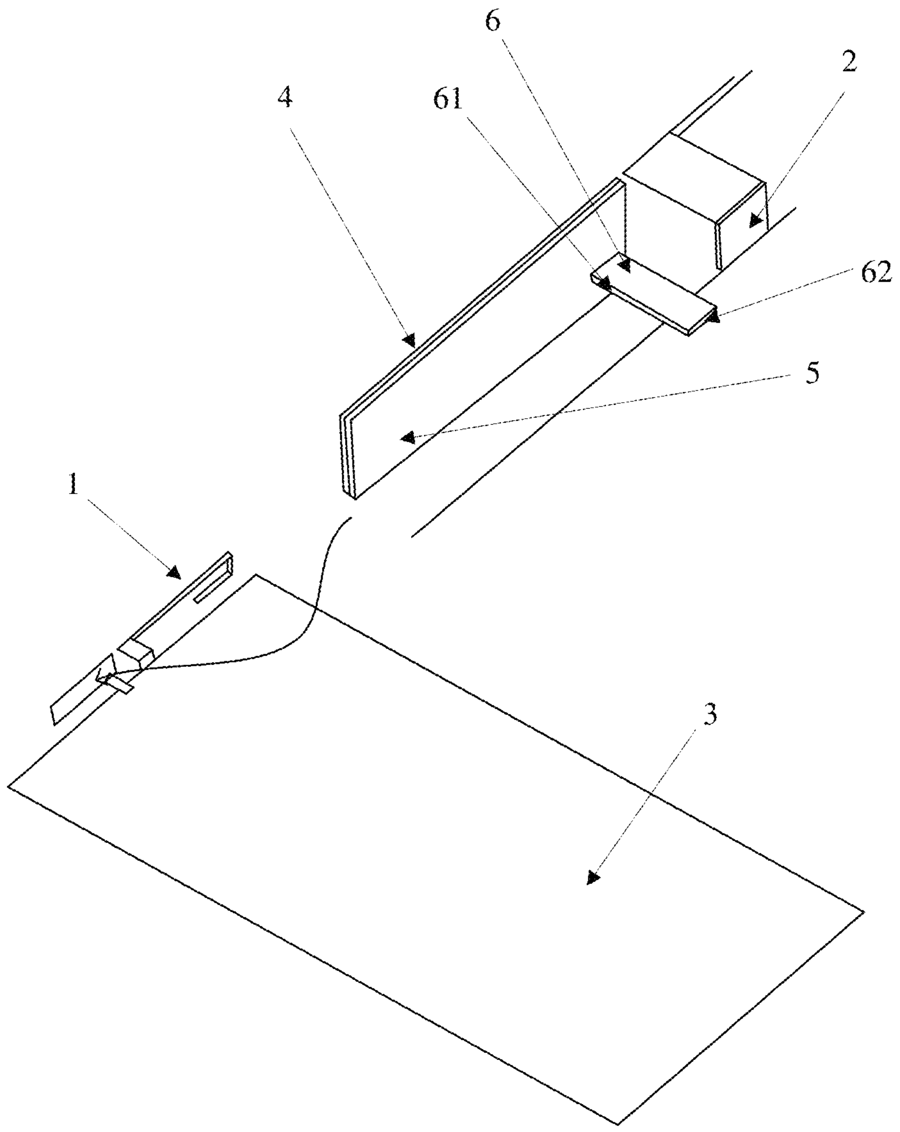
FIG. 3 is a structural diagram 3 of an antenna structure according to some embodiments of this disclosure.
Figure 4:
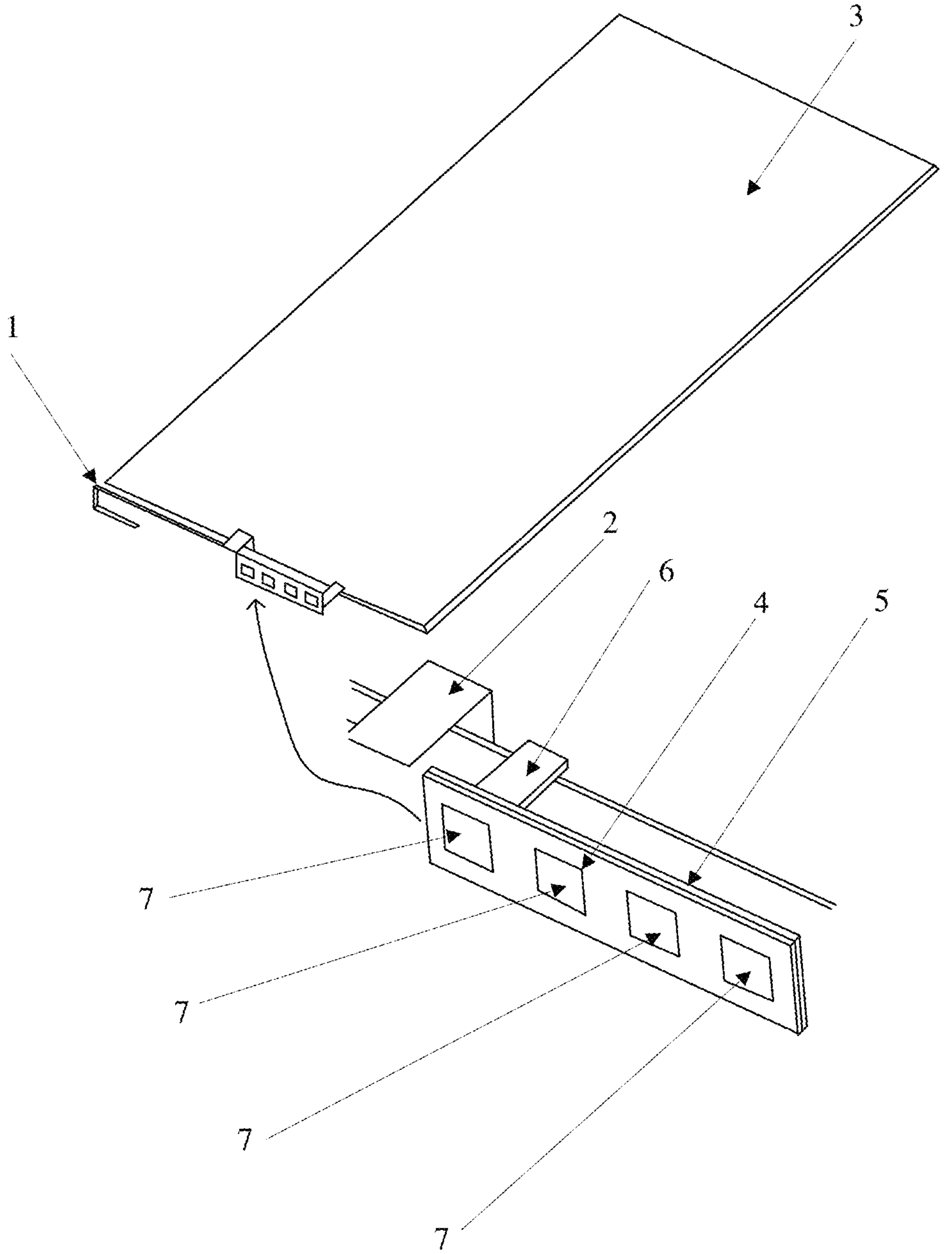
FIG. 4 is a structural diagram 4 of an antenna structure according to some embodiments of this disclosure.

In this embodiment, for better understanding the foregoing disposing manner, reference may be made to FIG. 3 and FIG. 4, both of which are a structural diagram of an antenna structure according to some embodiments of this disclosure. As shown in FIG. 3 and FIG. 4, the shield layer 61 of the second feed line portion 6 is connected to the second end of the second floor 5, and the second end is close to the resonant arm 1. In this way, the ground of the millimeter-wave array antenna, that is, the second floor 5, becomes a parasitic part of the sub-6 GHz antenna, acting as not only the ground of the millimeter-wave array antenna but also an antenna structure of the sub-6 GHz antenna.

In this embodiment, a millimeter-wave array antenna is added to the sub-6 GHz antenna, and a structure of the millimeter-wave array antenna is reused as a sub-6 GHz antenna or part of a sub-6 GHz antenna, so that the space and communication quality of the sub-6 GHz antenna are not affected. Moreover, the accommodating space for the millimeter-wave antenna is reduced, which helps reduce the volume of the terminal device.

Optionally, the at least two radiation pieces 7 are arranged along a length direction of the substrate 4.

In this embodiment, the at least two radiation pieces 7 are arranged along the length direction of the substrate 4. They may be arranged in one or more rows depending on the area of the substrate 4, which is not limited herein. The at least two radiation pieces 7 being arranged along the length direction of the substrate 4 facilitates the ease of disposing multiple radiation pieces 7 on the substrate 4 to form the millimeter-wave array antenna.

Optionally, a shape of a radiation piece 7 is square.

In this embodiment, the shape of a radiation piece 7 is square, and certainly, they may have some other shapes than the square, which is not limited in this embodiment.

Optionally, a distance between any two adjacent radiation pieces 7 in the at least two radiation pieces 7 is equal.

In this embodiment, the distance between any two adjacent radiation pieces 7 in the at least two radiation pieces 7 is equal, which facilitates the ease of disposing multiple radiation pieces, making full use of the area of the substrate 4, and making the millimeter-wave array antenna have better performance.

Optionally, the feed line 62 is electrically connected to a feed source, and a frequency range of the feed source is the frequency range of millimeter waves.

In this embodiment, the feed line 62 is electrically connected to a feed source, and the frequency range of the feed source is the frequency range of millimeter waves, so that the at least two radiation pieces 7 can radiate millimeter-wave signals.

The antenna structure according to some embodiments of this disclosure includes a resonant arm 1, a first feed line portion 2, a first floor 3, a substrate 4, and a second floor 5, a second feed line portion 6, and at least two radiation pieces 7, where the resonant arm 1 is electrically connected to the first floor 3 through the first feed line portion 2; the substrate 4 is attached to the second floor 5, the second floor 5 is disposed on a surface of the substrate 4 proximate to the first floor 3, and two ends of a shield layer 61 of the second feed line portion 6 are connected to the first floor 3 and the second floor 5, respectively; and the at least two radiation pieces 7 are disposed on a surface of the substrate 4 away from the second floor 5, the second feed line portion 6 wraps a feed line 62 inside, and the feed line 62 passes through the substrate 4 and the second floor 5 and electrically connects to the at least two radiation pieces 7. In this way, a millimeter-wave array antenna is added to the antenna structure, and a structure of the millimeter-wave array antenna is reused as a sub-6 GHz antenna or part of a sub-6 GHz antenna, so that the space and communication quality of the sub-6 GHz antenna are not affected. Moreover, the accommodating space for the millimeter-wave antenna is reduced, which helps reduce the volume of the terminal device.

Some embodiments of this disclosure further provide a terminal device, including the foregoing antenna structure.

In this embodiment, the terminal device may be a mobile phone, a tablet computer, a laptop computer, a personal digital assistant (PDA), a mobile internet device (MID), or a wearable device.

It should be noted that the terms “comprise”, “include”, and any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An antenna structure, comprising: a resonant arm, a first feed line portion, a first ground plane, a substrate, a second ground plane, a second feed line portion, and at least two radiation elements, wherein the resonant arm is electrically connected to the first ground plane through the first feed line portion;

the substrate is attached to the second ground plane, the second ground plane is disposed on a surface of the substrate proximate to the first ground plane, and two ends of a shield layer of the second feed line portion are connected to the first ground plane and the second ground plane, respectively; and the at least two radiation elements are disposed on a surface of the substrate away from the second ground plane, the second feed line portion wraps a feed line inside, and the feed line passes through the substrate and the second ground plane and electrically connects to the at least two radiation elements; wherein the shield layer of the second feed line portion is connected to a first end of the second ground plane, and the first end is away from the resonant arm.

2. The antenna structure according to claim 1, wherein a connecting portion is disposed between the resonant arm and the second ground plane.

3. The antenna structure according to claim 1, wherein the at least two radiation elements are arranged along a length direction of the substrate.

4. The antenna structure according to claim 1, wherein a shape of each radiation element of the at least two radiation elements is square.

5. The antenna structure according to claim 1, wherein a distance between any two adjacent radiation elements in the at least two radiation elements is equal.

6. The antenna structure according to claim 1, wherein the feed line is electrically connected to a feed source, and a frequency range of the feed source is the frequency range of millimeter waves.

7. A terminal device, comprising an antenna structure, wherein the antenna structure comprises a resonant arm, a first feed line portion, a first ground plane, a substrate, a second ground plane, a second feed line portion, and at least two radiation elements;

the resonant arm is electrically connected to the first ground plane through the first feed line portion;

the substrate is attached to the second ground plane, the second ground plane is disposed on a surface of the substrate proximate to the first ground plane, and two ends of a shield layer of the second feed line portion are connected to the first ground plane and the second ground plane, respectively; and the at least two radiation elements are disposed on a surface of the substrate away from the second ground plane, the second feed line portion wraps a feed line inside, and the feed line passes through the substrate and the second ground plane and electrically connects to the at least two radiation elements; wherein the shield layer of the second feed line portion is connected to a first end of the second ground plane, and the first end is away from the resonant arm.

8. The terminal device according to claim 7, wherein a connecting portion is disposed between the resonant arm and the second ground plane.

9. The terminal device according to claim 7, wherein the at least two radiation elements are arranged along a length direction of the substrate.

10. The terminal device according to claim 7, wherein a shape of each radiation element of the at least two radiation elements is square.

11. The terminal device according to claim 7, wherein a distance between any two adjacent radiation elements in the at least two radiation elements is equal.

12. The terminal device according to claim 7, wherein the feed line is electrically connected to a feed source, and a frequency range of the feed source is the frequency range of millimeter waves.

* * * * *